(12) United States Patent
Fernihough et al.

(10) Patent No.: US 10,921,165 B2
(45) Date of Patent: Feb. 16, 2021

(54) SEISMIC SENSOR STATION

(71) Applicant: SHELL OIL COMPANY, Houston, TX (US)

(72) Inventors: Robert Alexis Peregrin Fernihough, Georgetown, TX (US); Steven James Maas, Pflugerville, TX (US); Akbar Arab Sadeghabadi, Austin, TX (US)

(73) Assignee: SHELL OIL COMPANY, Houston, TX (US)

( * ) Notice: Subject to any disclaimer, the term of this patent is extended or adjusted under 35 U.S.C. 154(b) by 50 days.

(21) Appl. No.: 16/318,304

(22) PCT Filed: Jul. 13, 2017

(86) PCT No.: PCT/US2017/041877
§ 371 (c)(1),
(2) Date: Jan. 16, 2019

(87) PCT Pub. No.: WO2018/017387
PCT Pub. Date: Jan. 25, 2018

(65) Prior Publication Data
US 2019/0265083 A1 Aug. 29, 2019

Related U.S. Application Data

(60) Provisional application No. 62/363,612, filed on Jul. 18, 2016.

(51) Int. Cl.
*G01V 11/00* (2006.01)
*G01D 11/24* (2006.01)
(Continued)

(52) U.S. Cl.
CPC ......... *G01D 11/245* (2013.01); *G01D 11/24* (2013.01); *G01V 1/16* (2013.01); *G01V 1/162* (2013.01);
(Continued)

(58) Field of Classification Search
CPC ........ G01D 11/24; G01D 11/245; G01V 1/16; G01V 1/18
See application file for complete search history.

(56) References Cited

U.S. PATENT DOCUMENTS 3,360,772 A * 12/1967 Massa .................... G01V 1/181
367/188
3,445,809 A * 5/1969 McLoad ................ G01V 1/201
367/188
(Continued)

FOREIGN PATENT DOCUMENTS

| CN | 204065437 U | 12/2014 |
|---|---|---|
| WO | 2010014414 A2 | 2/2010 |
| WO | 2017184197 A1 | 10/2017 |

OTHER PUBLICATIONS

International Search Report and Written Opinion received for PCT Patent Application No. PCT/US2017/041877, dated Oct. 24, 2017, 11 pages.

*Primary Examiner* — Jamel E Williams

(57) ABSTRACT

A seismic sensor station employs a sensor unit that is mounted on a central mounting post attached to the base of a sensor station housing. The only path of mechanically supporting contact that exists between the sensor unit and the base is through the central mounting post.

20 Claims, 3 Drawing Sheets

(51) Int. Cl.
  *G01V 1/16* (2006.01)
  *G01V 1/18* (2006.01)
  *G01V 1/22* (2006.01)

(52) U.S. Cl.
  CPC .............. *G01V 1/166* (2013.01); *G01V 1/18* (2013.01); *G01V 1/226* (2013.01)

(56) References Cited

U.S. PATENT DOCUMENTS

| | | | |
|---|---|---|---|
| 3,517,316 A * | 6/1970 | Hatcher | G01V 1/001 |
| | | | 340/525 |
| 3,930,218 A | 12/1975 | Hall, Jr. | |
| 3,984,804 A * | 10/1976 | Herring | G01V 1/16 |
| | | | 367/188 |
| 3,993,859 A | 11/1976 | McNeel | |
| 4,809,245 A | 2/1989 | Woodall et al. | |
| 5,124,956 A * | 6/1992 | Rice | G01V 1/16 |
| | | | 181/122 |
| 5,369,485 A | 11/1994 | Hofler et al. | |
| 5,878,001 A | 3/1999 | McNeel et al. | |
| 6,628,400 B2 | 9/2003 | Goldner et al. | |
| 2005/0098377 A1 | 5/2005 | Bary et al. | |
| 2011/0222374 A1 | 9/2011 | Berg et al. | |
| 2011/0310704 A1 | 12/2011 | Ray et al. | |
| 2015/0043310 A1 * | 2/2015 | Maas | G01V 1/226 |
| | | | 367/188 |
| 2019/0265083 A1 * | 8/2019 | Fernihough | G01V 1/226 |
| 2019/0285761 A1 | 9/2019 | Maas et al. | |

* cited by examiner

SEISMIC SENSOR STATION

CROSS REFERENCE TO RELATED APPLICATIONS

This is a national stage application of International Application No. PCT/US2017/041877, filed 13 Jul. 2017, and claims benefit of U.S. Provisional Application No. 62/363,612, filed 18 Jul. 2016.

FIELD OF THE INVENTION

The present invention relates to a seismic sensor station.

BACKGROUND OF THE INVENTION

Seismic acquisition of subsurface earth structures can be useful for a variety of activities involving the subsurface, including for instance exploration of oil and gas, and monitoring geological formations and/or reservoirs during production of oil and gas and/or during injection of fluids into such formations and/or reservoirs. Seismic sensors may be positioned in a spread about a surface location for sensing properties of the subsurface structures. Such seismic sensors may be housed in sensor stations that may be distributed on a seismic cable.

For land-seismic, sensor stations may each comprise a housing supported on a spike, which may be driven into the ground in order to hold the sensor station in place and in good vibration contact with the ground. An example of such a sensor station on an optical seismic cable, described in US pre-grant publication No. US 2015/0043310, has a sensor unit positioned within a cavity provided inside a sensor housing. The sensor housing includes a base with a removable lid, whereby the sensor unit is secured to the base by screw connections in the four corners of the sensor unit.

SUMMARY OF THE INVENTION

In accordance with a first aspect of the present invention, there is provided a seismic sensor station comprising a housing comprising:
a base and a removable lid, which when assembled together form a shell whereby the base and the removable lid both have a shell side and an exterior side;
a central mounting post attached to the base and protruding into the shell side of the base;
a sensor unit mounted on the central mounting post, whereby no other mechanically supporting contact exists between the sensor unit and the base other than via the central mounting post.

BRIEF DESCRIPTION OF THE DRAWING

The invention will be further illustrated hereinafter by way of example only, and with reference to the non-limiting drawing. The drawing consists of the following figures.

These figures are not to scale. Identical reference numbers used in different figures refer to similar components.

DETAILED DESCRIPTION OF THE INVENTION

The presently proposed seismic sensor station employs a sensor unit that is mounted on a central mounting post attached to the base of a sensor station housing. The only path of mechanically supporting contact (constructive mechanical support) that exists between the sensor unit and the base is through the central mounting post.

As a result, the sensor unit is supported in the housing with minimal coupling to the housing. The housing effectively behaves as a pressure chamber. When exposed to for instance wind, the housing is squeezed. This causes the sensor unit to be deformed if the sensor unit is mounted in the housing in the manner as shown in US pre-grant publication No. US 2015/0043310. Such deformation adds acoustic signal which acts as noise to the sensor unit. By mounting the sensor unit only on the central mounting post, transfer of pressure from the housing to the sensor unit is avoided.

The sensor unit may suitably be mounted on the central mounting post by means of one single mounting screw. This provides an adequate coupling to the central mounting post in an easy-to-manufacture manner. Furthermore, the point of contact between the central mounting post and the sensor unit may be coincident with the center of mass of the sensor unit, which is beneficial for the sensitivity of the sensor unit to seismic waves. Suitably, the only point of contact is in the center of mass.

Figure 1:
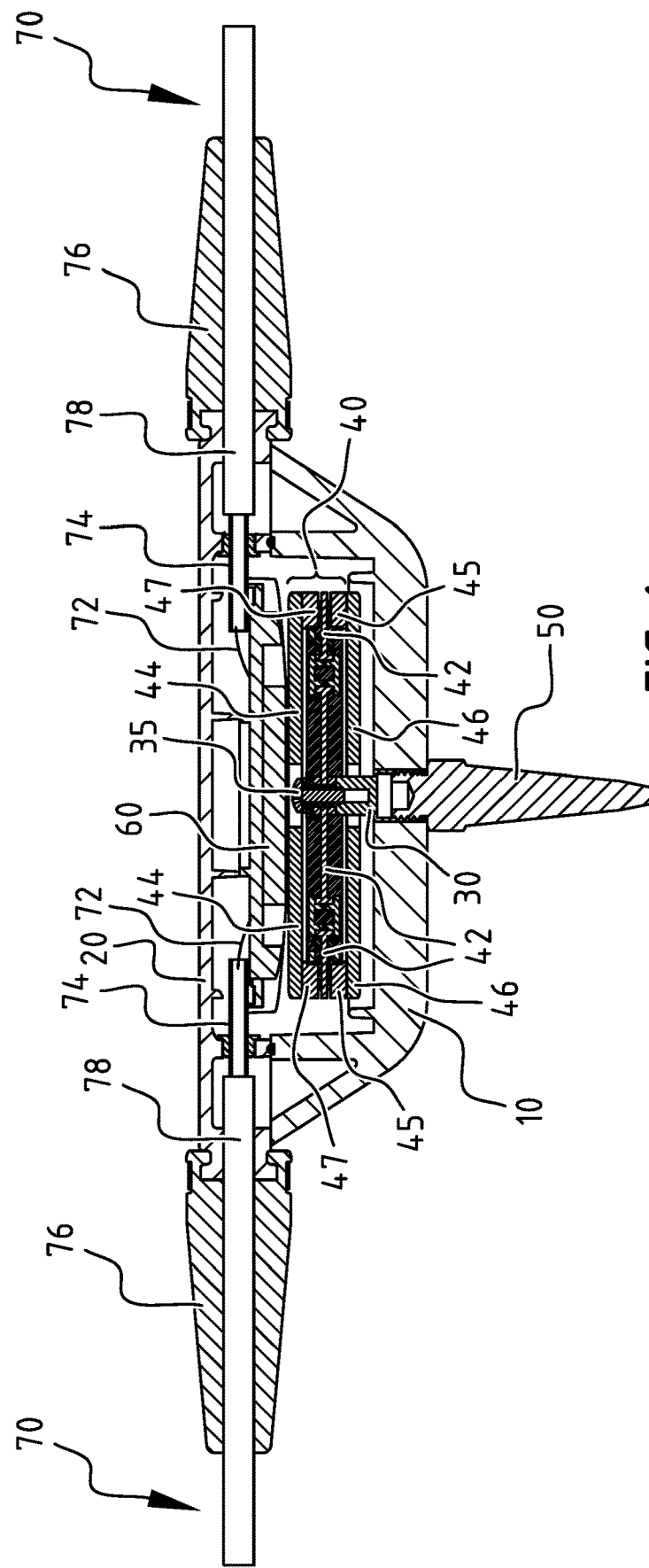
FIG. 1 shows a schematic cross sectional view of a seismic sensor station in assembled condition.
Figure 2:
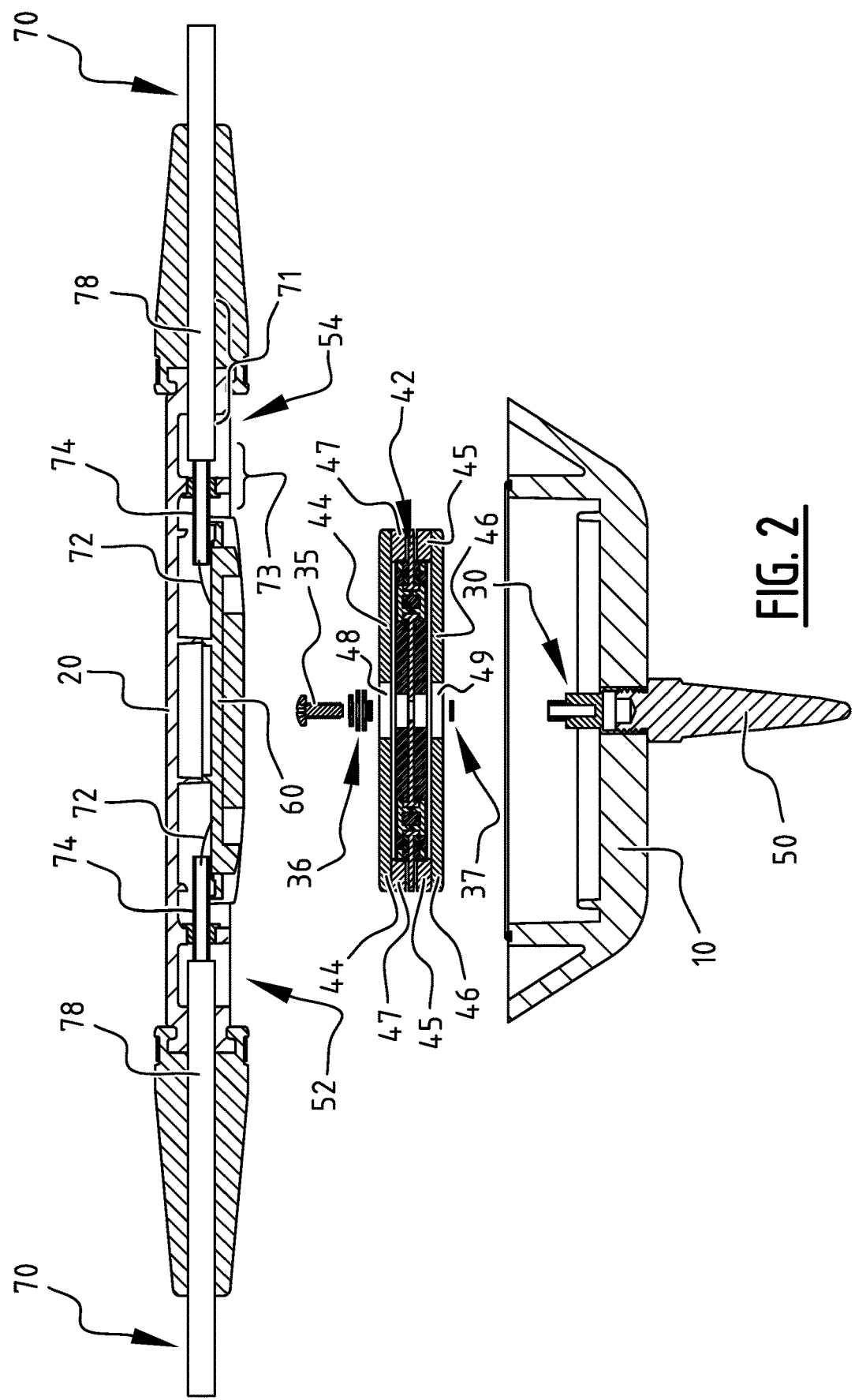
FIG. 2 shows a schematic cross sectional assembly view of the seismic sensor station of FIG. 1.

FIG. 1 shows a schematic cross sectional view of one example of the seismic sensor station, in assembled condition. FIG. 2 shows the same in an exploded view, and FIG. 3 in a top view of the sensor station in opened condition. The seismic sensor station comprises a base 10 and a removable lid 20. When assembled, such as is the case in FIG. 1, the base 10 and removable lid 20 together form a shell whereby the base and the removable lid both have a shell side facing inward and an exterior side facing to the exterior environment. A central mounting post 30 is attached to the base 10, and protruding into the shell side of the base 10. A sensor unit 40 is mounted on the central mounting post 30, suitably by means of one single mounting screw 35. The only mechanical contact between the sensor unit 40 and the base 10 is via the central mounting post 30. No other mechanically supporting contact exists between the sensor unit 40 and the base 10. This way, external vibrations are coupled to the sensor unit 40 exclusively via the central mounting post 30. Optionally, one or more optional washers 36,37 may be provided sandwiched between the sensor unit 40 and the screw head and/or between the sensor unit 40 and the central mounting post 30.

The central mounting post 30 may be formed integral to the base 10. Alternatively, the central mounting post 30 may consist of an insert piece that is inserted into a through-hole provided in the base 10. Either way, the central mounting post 30 (or the insert piece) is suitably provided with a shell-side receptacle to engage with the mounting screw 35, on the shell side of the base 10.

The sensor station may further comprise a sensor spike 50 attached to the central mounting post 30 on the exterior side of the base 10. Herewith, a direct vibration coupling is established between the sensor spike 50 and the sensor unit 40, only through the central mounting post 30. The sensor spike 50 is suitably adapted to be inserted into the ground, to secure the sensor station in one location in a seismic field and to enhance vibration coupling between the ground and the sensor unit 40. The mounting post 30 or insert piece may suitably be provided with an exterior-side receptacle, to engage with the sensor spike 50. One, or preferably both, of the receptacles may be provided with internal threads to facilitate securing the mounting screw 35 and/or the sensor spike 50 by a threaded connection.

The sensor unit 40 suitably comprises a central sensor plate 42, which is mounted transversely on the central mounting post 30 (the mounting post 30 thus generally extending in a normal direction perpendicular to the central sensor plate 42), with optical sensor fibers 75 disposed on the central sensor plate 42. An efficient vibration contact may be established between the central mounting post 30 and the central sensor plate 42 by applying pressure between the central sensor plate 42 and the central mounting post 30 (suitably using the mounting screw, with or without one or more washers 37 sandwiched between the central sensor plate 42 and the central mounting post 30). Suitably, the only point of contact between the central mounting post 30 and the sensor unit 40 is exclusively in the center of mass of the sensor unit 40. This ensures that the sensor unit 40 can vibrate around its own center of mass as freely as possible.

The sensor unit 40 may further comprise one or more sensor weights. Suitably, a first sensor weight is mechanically supported on the central sensor plate 42 on an upward-facing side of the central sensor plate 42 (which in assembled condition faces away from the central mounting post 30 and towards the lid 20 of the housing), while a second sensor weight is mechanically supported on the central sensor plate 42 on a base-facing side thereof. The center of mass of the sensor unit 40, including these sensor weights, preferably lies on the central sensor plate 42, coinciding with the point of contact with the central mounting post 30.

A sandwich structure is thus formed, wherein the first sensor weight comprises a flat first weight tablet 44 mounted parallel to the central sensor plate 42 with spacers 47 between the flat first weight tablet 44 and the central sensor plate 42, and wherein the second sensor weight comprises a flat second weight tablet 46 mounted parallel to the central sensor plate 42 with spacers 45 between the flat second weight tablet 46 and the central sensor plate 42. The flat second weight tablet 46 is suitably provided with a second through-opening 49 through which the central mounting post 30 protrudes, without having any direct point of contact between the central mounting post 30 and the second sensor weight tablet 46. This allows maximum unobstructed vibration of the sensor unit 40 on the central mounting post 30. The flat first weight tablet 44 may be provided with a first through-opening 48, vertically aligned with the second through-opening 49, to provide space for the mounting screw 35 to engage with the central sensor plate 42 without touching the flat first weight tablet 44. The tablets and/or spacers may be held in place by any suitable means, such as by screw connections and/or an adhesive such as glue or epoxy.

Figure 3:
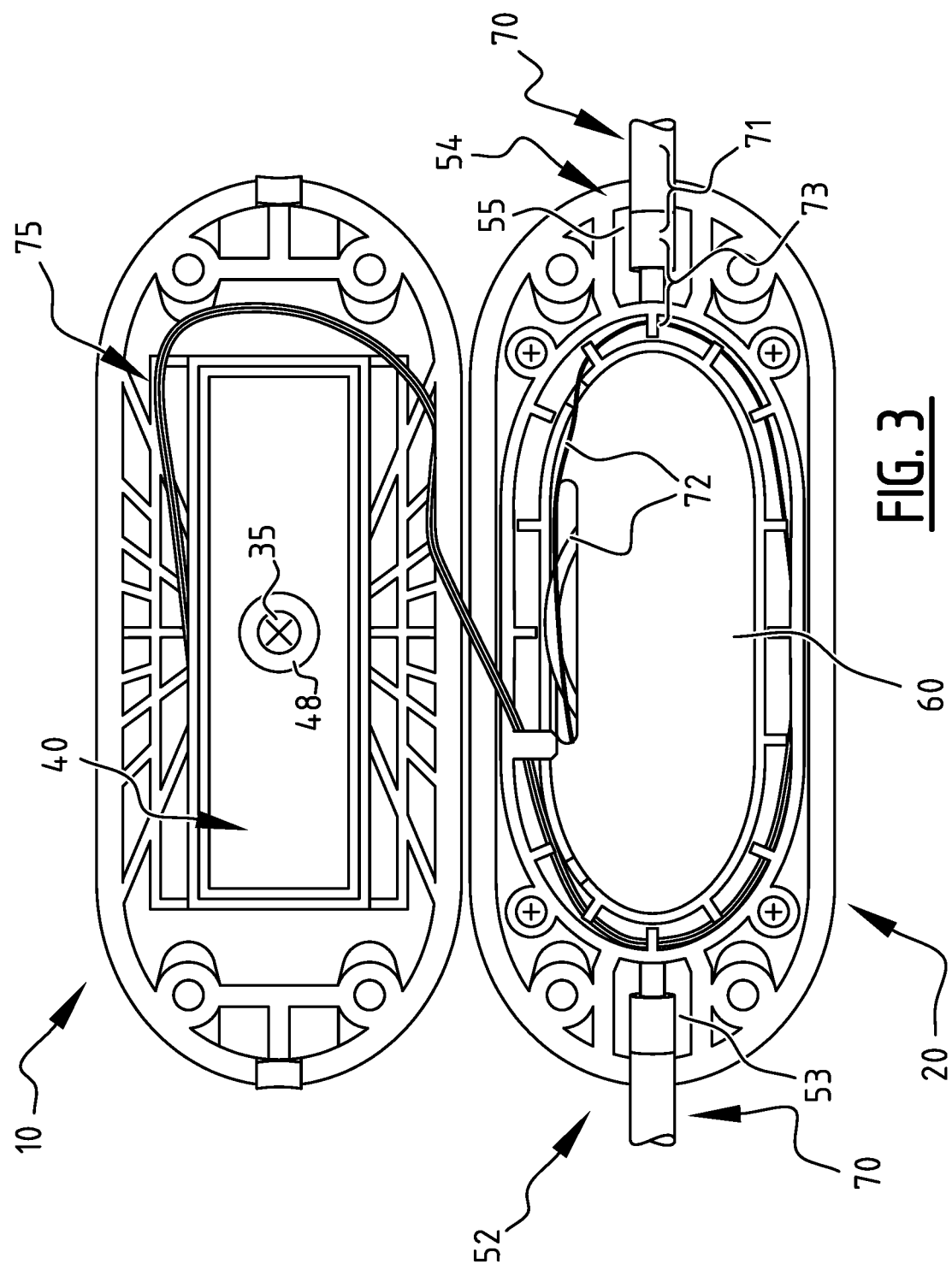
FIG. 3 shows a schematic top view of inside of the base and the lid of the seismic sensor station of FIG. 1 in opened condition.

Turning now to the lid 20, as best visualized in FIGS. 2 and 3, it can be seen that the lid 20 is provided with two cable docking ports (52,54), each allowing passage of a fiber optical cable 70 from outside to inside the shell. The two cable docking ports 52,54 are exclusively provided in the removable lid 20. Complexity that is associated with connecting the fiber optical cable 70 from outside to inside the shell can herewith be fully provided in the removable lid 20, while freeing up space in the base 10 to house the sensor unit 40. This also facilitates ease of replacement of the sensor unit 40 in case of malfunction. Cable supports 76 may be provided on each of the cable docking ports 52,54 to alleviate the fiber optical cable 70 from excess mechanical stressing at the transition from the outside to inside the shell of the sensor station.

A fiber management tray 60 is suitably suspended from the removable lid 20 on the shell side of the removable lid 20. One or more optical fibers 72 from the optical cable 70 entering the shell via the two cable docking ports 52,54 may be looped on the fiber management tray 60, in an excess fiber storage space defined between the fiber management tray 60 and the removable lid 20. When removing the lid 20 from the base 10, the fiber optical cable 70 together with the fiber management tray 60 as well as the one or more optical fibers 72 looped in the excess fiber storage space, are all removed from the base 10 together with the lid 20. A communication opening is provided in the fiber management tray 60, for routing one or more sensor fibers 75 to the sensor unit 40. These sensor fibers are optically connected to the sensor unit 40 and in turn they optically connect the sensor unit 40 to one or more of the optical fibers 72 that are looped in the lid 20.

To make the entire connection robust, each of the cable docking ports 52,54 suitably comprises an filler chamber 53,55. Each filler chamber 53,55 may be integrally formed in the removable lid 20, thus forming inseparable part of the removable lid 20. At least a first part 71 of the fiber optical cable 70 passes from outside of the shell into each filler chamber 53,55, and at least a second part 73 of the fiber optical cable passes from each filler chamber 53,55 into the shell. Each filler chamber 53,55 is filled with an adhesive filler, suitably an epoxy filler, surrounding the parts of the fiber optical cable 70 that pass in and out of the filler chamber 53,55.

Suitably, the fiber optical cable 70 comprises an inner channel 74, which may be embodied in the form of a flexible tube, through which the one or more optical fibers 72 extend. The inner channel may be surrounded by a protective mantle 78, designed to provide mechanical strength and protection to the inner channel 74 and/or the one or more optical fibers 72 contained in it. The protective mantle 78 may also provide chemical protection by shielding the inner channel 74 and/or the one or more optical fibers 72 from substances that may come in contact with the exterior of the fiber optical cable 70. The protective mantle 78 may contain reinforcement fibers, for instance fibers made of super materials such as Kevlar™ fibers, Twaron™ fibers or Dyneema™ fibers. Suitably, the protective mantle 78 may be cut back slightly, whereby the inner channel 74 passes all the way through the filler chamber 53,55 while the protective mantle 78 enters the filler chamber 53,55 on one side but does not make it all the way through the filler chamber 53,55. The termination of the protective mantle 78 including any loose ends of, for instance, reinforcement fibers or other constituents of the protective mantle 78 may suitably be embedded within the filler in the filler chamber 53,55 to fixate it and to effectively transfer tensional forces in the fiber optic cable to the structure of the removable lid 20. The one or more optical fibers 72 that pass through the seismic sensor station are thereby effectively decoupled from tension in the chain of fiber optic cable 70 with the sensor stations, and can thus pass through the seismic sensor station freely.

The seismic sensor station is not limited to the elements and features described above, and it may comprise other useful features. For instance, the seismic sensor station may comprise optical fiber handling equipment such as optical splitters, fiber splicers, fiber clamps, multiplexers or demultiplexers and the like. Optical splitters allow taping off some of the light from the optical fiber 72 into the sensor fibers 75 and re-injecting a return signal from the sensor fibers 75 into the optical fiber 72. This allows light in optical fiber 72 to bypass the sensor unit 40 as it passes through the seismic sensor station between the cable docking ports 52,54. The seismic sensor station may also be provided with a radio frequency identification tag (RFID tag) to facilitate tracking and storing its location in the seismic field.

The person skilled in the art will readily understand that, while the invention has been illustrated making reference to one or more a specific combinations of features and measures, many of those features and measures are functionally independent from other features and measures such that they can be equally or similarly applied independently in other embodiments or combinations. The person skilled in the art will also understand that the present invention can be carried out in many various ways without departing from the scope of the appended claims.

That which is claimed is:

1. A seismic sensor station comprising a housing comprising:
   a base and a removable lid, which when assembled together form a shell whereby the base and the removable lid both have a shell side and an exterior side;
   a central mounting post attached to the base and protruding into the shell side of the base;
   a sensor unit mounted on the central mounting post, whereby no other mechanically supporting contact exists between the sensor unit and the base other than via the central mounting post,
   wherein the sensor unit comprises:
   a central sensor plate mounted transversely on the central mounting post;
   optical sensor fibers disposed on the central sensor plate; and
   two sensor weights whereby a first of the two sensor weights is mechanically supported on the central sensor plate on a lid facing side of the central sensor plate and a second of the two is mechanically supported on the central sensor plate on a base facing side.

2. The seismic sensor station of claim 1, wherein the central mounting post consists of an insert piece inserted into a through-hole provided in the base, and wherein the insert piece is provided with a shell-side receptacle to engage with a mounting screw on the shell side of the base and an exterior-side receptacle to engage with a sensor spike.

3. The seismic sensor station of claim 1, further comprising:
   a sensor spike attached to the central mounting post on the exterior side of the base, and protruding outward from the shell.

4. The seismic sensor station of claim 1, wherein the sensor unit is mounted on the central mounting post by means of one single mounting screw.

5. The seismic sensor station of claim 1, wherein the sensor unit comprises a center of mass, and wherein there is a point of contact between the central mounting post and the sensor unit in the center of mass of the sensor unit.

6. The seismic sensor station of claim 5, wherein the point of contact is uniquely in the center of mass.

7. The seismic sensor station of claim 1, wherein the sensor unit comprises a sandwich structure, wherein the first sensor weight comprises a flat first weight tablet mounted parallel to the central sensor plate with spacers between the flat first weight tablet and the central sensor plate, and wherein the second sensor weight comprises a flat second weight tablet mounted parallel to the central sensor plate with spacers between the flat second weight tablet and the central sensor plate.

8. The seismic sensor station of claim 7, wherein the flat second weight tablet is provided with a second through-opening through which the central mounting post protrudes without having any direct point of contact between the central mounting post and the second sensor weight.

9. The seismic sensor station of claim 8, wherein the flat first weight tablet is provided with a first through-opening vertically aligned with the second through-opening.

10. The seismic sensor station of claim 1, wherein the housing is provided with two cable docking ports, each allowing passage of a fiber optical cable from outside to inside the shell.

11. The seismic sensor station of claim 10, wherein the two cable docking ports are exclusively provided in the removable lid.

12. The seismic sensor station of claim 11, wherein a fiber management tray is suspended from the removable lid on the shell side of the removable lid and wherein one or more optical fibers entering the shell via the two cable docking ports are looped on the fiber management tray, in an excess fiber storage space defined between the fiber management tray and the removable lid.

13. The seismic sensor station of claim 12, wherein a communication opening is provided in the fiber management tray for routing one or more sensor fibers to the sensor unit whereby the sensor fibers are optically connected to the sensor unit.

14. The seismic sensor station of claim 10, wherein each of the cable docking ports comprises an filler chamber, which filler chamber is integrally formed in the removable lid, whereby at least a first part of the fiber optical cable passes from outside of the shell into the filler chamber and whereby at least a second part of the fiber optical cable passes from the filler chamber into the shell, and wherein the filler chamber is filled with an adhesive filler surrounding the fiber optical cable.

15. The seismic sensor station of claim 1, wherein the central mounting post comprises an insert piece inserted into a through-hole provided in the base, and wherein the insert piece is provided with a shell-side receptacle to engage with a mounting screw on the shell side of the base and an exterior-side receptacle to engage with a sensor spike.

16. A seismic sensor station comprising a housing comprising:
   a base and a removable lid, which when assembled together form a shell whereby the base and the removable lid both have a shell side and an exterior side;
   a central mounting post attached to the base and protruding into the shell side of the base;
   a sensor unit mounted on the central mounting post, whereby no other mechanically supporting contact exists between the sensor unit and the base other than via the central mounting post,
   wherein the housing is provided with two cable docking ports, each allowing passage of a fiber optical cable from outside to inside the shell, wherein the two cable docking ports are exclusively provided in the removable lid,
   wherein a fiber management tray is suspended from the removable lid on the shell side of the removable lid and wherein one or more optical fibers entering the shell via the two cable docking ports are looped on the fiber management tray, in an excess fiber storage space defined between the fiber management tray and the removable lid.

17. The seismic sensor station of claim 16, wherein a communication opening is provided in the fiber management tray for routing one or more sensor fibers to the sensor unit whereby the sensor fibers are optically connected to the sensor unit.

18. The seismic sensor station of claim 16, wherein each of the cable docking ports comprises an filler chamber, which filler chamber is integrally formed in the removable lid, whereby at least a first part of the fiber optical cable passes from outside of the shell into the filler chamber and whereby at least a second part of the fiber optical cable passes from the filler chamber into the shell, and wherein the filler chamber is filled with an adhesive filler surrounding the fiber optical cable.

19. A seismic sensor station comprising a housing comprising:
- a base and a removable lid, which when assembled together form a shell whereby the base and the removable lid both have a shell side and an exterior side;
- a central mounting post attached to the base and protruding into the shell side of the base;
- a sensor unit mounted on the central mounting post, whereby no other mechanically supporting contact exists between the sensor unit and the base other than via the central mounting post,
wherein the housing is provided with two cable docking ports, each allowing passage of a fiber optical cable from outside to inside the shell, wherein each of the cable docking ports comprises an filler chamber, which filler chamber is integrally formed in the removable lid, whereby at least a first part of the fiber optical cable passes from outside of the shell into the filler chamber and whereby at least a second part of the fiber optical cable passes from the filler chamber into the shell, and wherein the filler chamber is filled with an adhesive filler surrounding the fiber optical cable.

20. The seismic sensor station of claim 19, further comprising:
- a sensor spike attached to the central mounting post on the exterior side of the base, and protruding outward from the shell.

* * * * *